United States Patent
Campbell et al.

(10) Patent No.: US 12,120,728 B2
(45) Date of Patent: *Oct. 15, 2024

(54) SCHEDULING ENERGY HARVESTING NODES IN A WIRELESS SENSOR NETWORKS

(71) Applicant: Texas Instruments Incorporated, Dallas, TX (US)

(72) Inventors: Bradford James Campbell, Ann Arbor, MI (US); Ariton E. Xhafa, Plano, TX (US); Anuj Batra, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/324,515

(22) Filed: May 26, 2023

(65) Prior Publication Data

US 2023/0300876 A1   Sep. 21, 2023

Related U.S. Application Data

(63) Continuation of application No. 17/396,868, filed on Aug. 9, 2021, now Pat. No. 11,700,635, which is a continuation of application No. 16/557,002, filed on Aug. 30, 2019, now Pat. No. 11,089,605, which is a continuation of application No. 13/951,839, filed on Jul. 26, 2013, now Pat. No. 10,405,326.

(60) Provisional application No. 61/678,313, filed on Aug. 1, 2012.

(51) Int. Cl.
*H04W 72/56*   (2023.01)

(52) U.S. Cl.
CPC ............. *H04W 72/56* (2023.01); *Y02D 30/70* (2020.08)

(58) Field of Classification Search
None
See application file for complete search history.

(56) References Cited

U.S. PATENT DOCUMENTS

| | | |
|---|---|---|
| 8,432,887 B1 | 4/2013 | Ding |
| 9,071,066 B2 | 6/2015 | Iwamoto |
| 9,680,327 B2 | 6/2017 | Scheb |
| 9,721,210 B1 | 8/2017 | Brown |
| 9,936,451 B2 | 4/2018 | Zhu |
| 10,097,258 B1 | 10/2018 | Wakayama |
| 10,405,326 B2 | 9/2019 | Campbell |

(Continued)

*Primary Examiner* — Steve R Young
(74) *Attorney, Agent, or Firm* — Mandy Barsilai Fernandez; Frank D. Cimino

(57) ABSTRACT

A system and method for optimizing power consumption of energy harvesting nodes in a wireless sensor network. In one embodiment, a system includes a network coordinator. The network coordinator includes a wireless transceiver and a controller. The wireless transceiver is configured to provide access to the wireless sensor network. The controller is configured to determine whether a wireless device that is wirelessly communicating with the network coordinator is powered via energy harvesting. The controller is also configured to schedule, based on a determination that the wireless device is powered via energy harvesting, the wireless device to communicate via the wireless sensor network using a priority timeslot of a superframe of the wireless sensor network. The priority timeslot is a timeslot occurring in an initial portion of the superframe.

20 Claims, 2 Drawing Sheets

(56) References Cited

U.S. PATENT DOCUMENTS

| | | |
|---|---|---|
| 2003/0214389 A1 | 11/2003 | Arneson |
| 2008/0253327 A1* | 10/2008 | Kohvakka ............. H04W 16/14 |
| | | 370/330 |
| 2012/0163263 A1 | 6/2012 | Oh |
| 2012/0323415 A1 | 12/2012 | Atluri |
| 2013/0157729 A1 | 6/2013 | Tabe |
| 2013/0265140 A1 | 10/2013 | Gudan |
| 2015/0201342 A1* | 7/2015 | Vannithamby ...... H04W 52/243 |
| | | 370/254 |
| 2015/0303741 A1 | 10/2015 | Malik |
| 2017/0347321 A1 | 11/2017 | Del Carpio Vega |
| 2018/0167224 A1 | 6/2018 | Brandt |

* cited by examiner

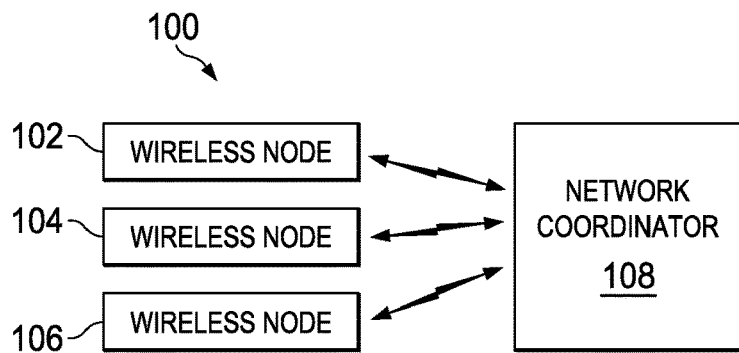
FIG. 1
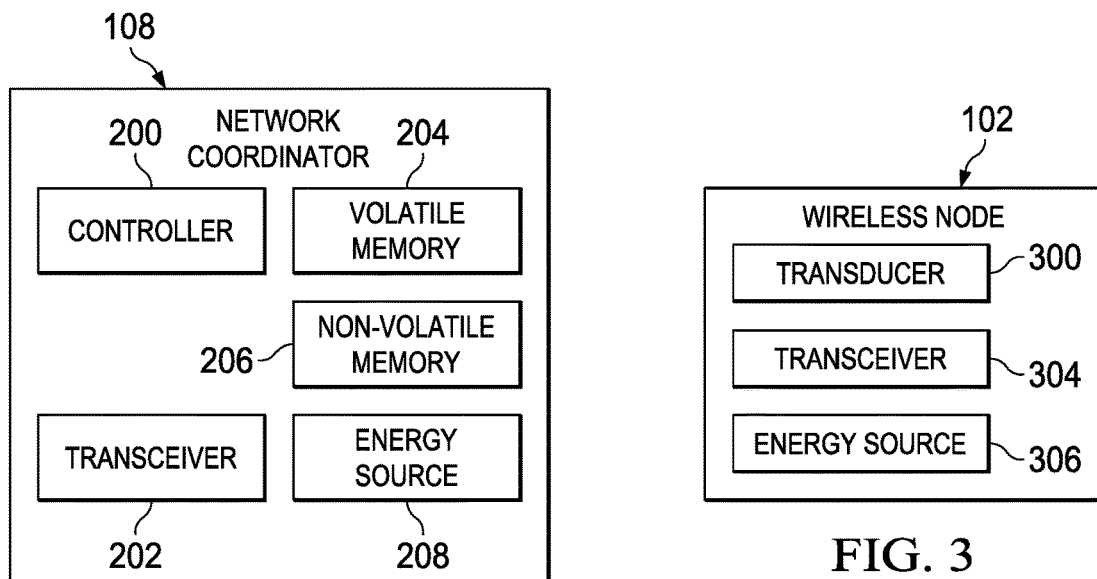
FIG. 2
FIG. 3
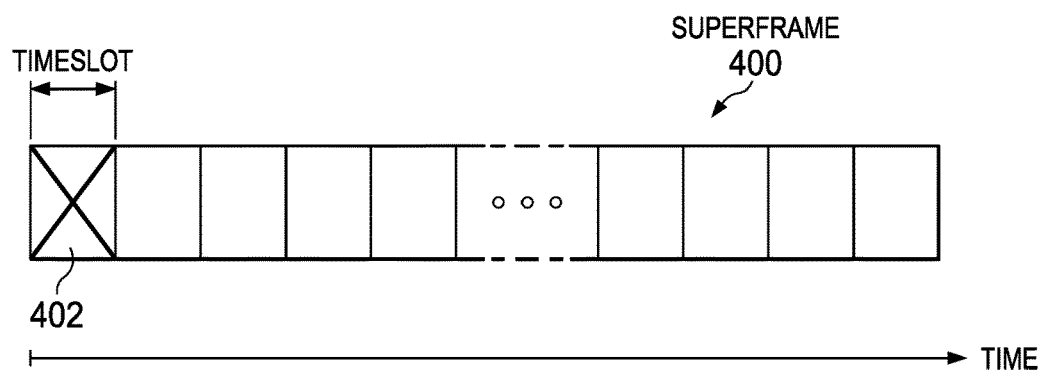
FIG. 4

SCHEDULING ENERGY HARVESTING NODES IN A WIRELESS SENSOR NETWORKS

CROSS-REFERENCE TO RELATED APPLICATION

This application is a continuation of U.S. patent application Ser. No. 17/396,868, filed Aug. 9, 2021, which is a continuation of U.S. patent application Ser. No. 16/557,002, filed Aug. 30, 2019, now U.S. Pat. No. 11,089,605, which is a continuation of U.S. patent application Ser. No. 13/951,839, filed Jul. 26, 2013, now U.S. Pat. No. 10,405,326, which claims the benefit of U.S. Provisional Patent Application No. 61/678,313, filed Aug. 1, 2012, each of which is incorporated herein by reference.

BACKGROUND

Wireless sensor networks (WSNs) are used in a variety of applications, including industrial process monitoring and control, environment monitoring, military systems, traffic monitoring, health care, etc. In general, it is desirable for the sensor nodes of a WSN to operate after deployment for as long as possible. Many sensor nodes are battery powered, and the operating life of the sensor node is limited by the life of the battery. To overcome this limitation, in an increasing number of WSN applications, sensor nodes are powered via harvesting of ambient energy such as wind, solar, thermal, vibration or radio frequency (RF). The amount of energy available from energy harvesting, at a given time, may be small relative to that available from a battery.

SUMMARY

Various systems and methods for optimizing power consumption of energy harvesting nodes in a wireless sensor network (WSN) are disclosed herein. In some embodiments, a method includes determining, by a network coordinator in the WSN, whether a wireless device that is wirelessly communicating with the network coordinator is powered via energy harvesting. Based on a determination that the wireless device is powered via energy harvesting, the network coordinator schedules the wireless device to communicate via the WSN using a priority timeslot of a superframe in the WSN. The priority timeslot is a timeslot occurring in an initial portion of the superframe.

In accordance with at least some embodiments, a system includes a wireless device powered via energy harvesting and a network coordinator configured to manage access to a WSN. The network coordinator further comprises a controller configured to determine whether the wireless device is powered via energy harvesting and schedule, based on a determination that the wireless is powered via energy harvesting, the wireless device to communicate via the WSN using a priority timeslot of a superframe of the WSN. The priority timeslot is a timeslot occurring in an initial portion of the superframe.

In accordance with yet other embodiments, a network coordinator includes a wireless transceiver and a controller. The wireless transceiver is configured to provide access to the WSN. The controller is configured to determine whether a wireless device that is wirelessly communicating with the network coordinator is powered via energy harvesting. The controller is also configured to schedule, based on a determination that the wireless device is powered via energy harvesting, the wireless device to communicate via the WSN using a priority timeslot of a superframe of the WSN. The priority timeslot is a timeslot occurring in an initial portion of the superframe.

BRIEF DESCRIPTION OF THE DRAWINGS

For a detailed description of exemplary embodiments of the invention, reference will now be made to the accompanying drawings in which:

FIG. 1 shows a block diagram of an illustrative wireless sensor network in accordance with various embodiments;

FIG. 2 shows a block diagram of a network coordinator for a wireless sensor network in accordance with various embodiments;

FIG. 3 shows a block diagram of a wireless sensor node for use in a wireless sensor network in accordance with various embodiments;

FIG. 4 shows an illustrative superframe for wireless communication in a network in accordance with various embodiments;

NOTATION AND NOMENCLATURE

Figure 5:
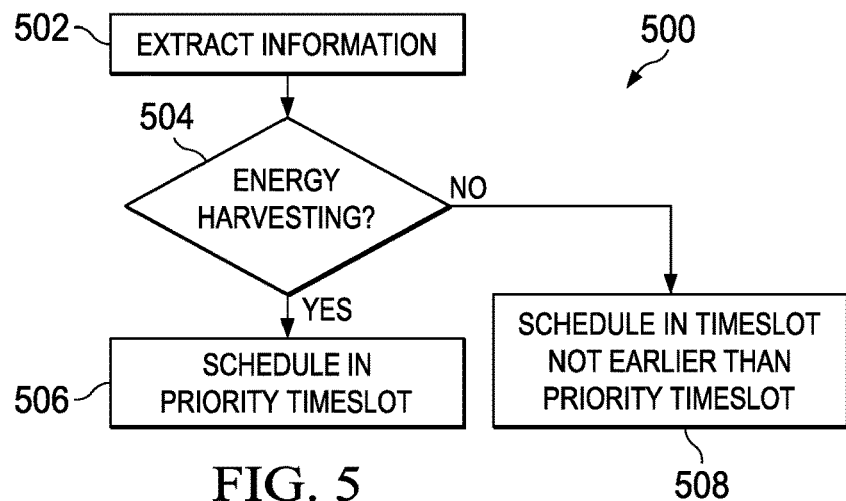
FIG. 5 shows a flow diagram for a method for scheduling wireless sensor nodes in a wireless sensor network in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In order to effectively utilize an energy harvesting node in a wireless sensor network (WSN), the power consumption of an energy harvesting node should be minimized. Embodiments of the present disclosure reduce the time spent by a wireless node powered by energy harvesting in an operating power state, and increase the sleep time of the node, by identifying the node as being powered by energy harvesting and scheduling network communication to reduce overall node activity time. Thus, embodiments disclosed herein include identification and scheduling that provide improved efficiency in the energy utilization of wireless devices powered via energy harvesting.

FIG. 1 shows a block diagram of an illustrative wireless sensor network 100 in accordance with various embodiments. The network 100 includes a network coordinator 108 and a plurality of wireless sensor nodes (102, 104, 106), also referred to as wireless sensor devices or simply, sensor nodes. Wireless sensor nodes 102-106 detect a condition of the environment in which they are disposed, and wirelessly communicate information indicative of the sensed environment to the network coordinator 108. Each wireless sensor node may communicate with neighboring wireless sensor nodes to form an ad-hoc network in which a wireless sensor node repeats transmissions received from other sensor nodes to relay data through the network 100.

The network coordinator 108 may be configured to manage the sensor nodes 102-106, collect and analyze data received from sensor nodes 102-106, and connect network 100 with a wide area network (WAN) for remote data access. The network coordinator 108 receives measurements and other information transmitted by the sensor nodes 102-106, and may provide control information to the sensor nodes 102-106. While, as a matter of convenience, FIG. 1 shows only three sensor nodes 102-106 and a single network coordinator 108, in practice, the network 100 may include any number of sensor nodes and coordinators. Each of the sensor nodes 102-106 may be powered via variety of different power sources, including but not limited to alternating current (AC), a battery, or an energy harvesting subsystem.

Energy harvesting or energy scavenging is a process by which energy is derived from ambient sources (e.g., wind, solar power, thermal energy, salinity gradients, radio frequency (RF), vibration, kinetic energy, etc.), captured, and/or stored. Devices powered via energy harvesting may be provided with only a small amount of power by an energy harvesting subsystem. At least some of the sensor nodes 102-106 are powered by energy harvesting.

FIG. 2 shows a block diagram of the network coordinator 108 configured to manage wireless sensor nodes 102-106 within the WSN 100 in accordance with various embodiments. The network coordinator 108 includes a controller 200, a wireless transceiver 202, volatile memory 204, non-volatile memory 206, and an energy source 208. The controller 200 may be a general-purpose microprocessor or other instruction execution device suitable for use in the network coordinator 108. The volatile memory 204 may be a semiconductor random access memory (RAM), such as static RAM (SRAM), or other volatile memory suitable for use in the network coordinator 108. The non-volatile memory 206 may be a FLASH memory, electrically erasable programmable read-only memory (EEPROM), ferroelectric RAM (FRAM), or other non-volatile memory suitable for use in the network coordinator 108. The energy source 208 provides power to operate the controller 200, the memories, 204, 206, and other components of the network coordinator 108. The energy source 208 may include a battery, an energy harvesting system, and/or other power source suitable for use in the network coordinator 108.

The transceiver 202 provides communication via a wireless network. The transceiver 202 is coupled to the controller 200, and provides information received via the wireless network to the controller 200. For example, the transceiver 202 may provide to the controller 200, values measured by the sensor nodes 102-106, sensor node identification information, and other information received via the wireless network.

The controller 200 processes the information received to provide management of the wireless network. For example, the controller 200 may provide scheduling services that determine when each of the sensor nodes 102-106 may communicate via the wireless network. Embodiments of the controller 200 schedule sensor node access to the wireless network based, at least in part, on the type of energy source powering each sensor node 102-106. The controller 200 may receive information identifying the energy source powering a sensor node via the wireless network.

FIG. 3 shows a block diagram of the wireless sensor node 102. The block diagram may also be applicable to nodes 104, 106, and other wireless device communicating via the wireless network 100. The sensor node 102 includes a transceiver 304 and an energy source 306, and may also include one or more transducers 300. In some embodiments, the energy source 306 includes an energy harvesting subsystem. The sensor node 102 also provides information indicating whether the sensor node 102 is powered via energy harvesting. For example, the sensor node 102 may provide a flag that indicates whether the sensor node 102 is powered by energy harvesting, and wirelessly transmit the flag to the coordinator 108. The sensor node 102 may include a processor or other logic that controls operation of the node 102, constructs packets for transmission, parses received transmissions, etc.

The transducers 300 detect conditions in the environment of the wireless sensor node 102 and provide measurements of the conditions to the network coordinator 108. For example, embodiments of the sensor node 102 may measure temperature, pressure, electrical current, humidity, or any other parameter associated with the environment of the wireless sensor 102.

The transceiver 304 converts signals between electrical and electromagnetic forms to enable the wireless sensor node 102 to wirelessly communicate with the sensor nodes 104 and 106, the network coordinator 108, and other nodes in the WSN 100.

To minimize power consumption of sensor nodes powered via energy harvesting, embodiments of the network 100 employ a Time Division Multiple Access (TDMA) scheduling technique that can reduce the time that an energy harvesting node is in an operating power mode, and increase the time spent by the node in a reduced power mode. The disclosed scheduling mechanism may be applied in conjunction with networking protocols such as those defined by the IEEE802.15.4e standard or other networking protocols or standards.

As noted herein, sensor node 102 provides wireless transmissions including information specifying the energy source powering the node 102. The coordinator 108 extracts the information from the wireless transmissions that indicates what type of energy source is powering the sensor node 102, and schedules the sensor node 102 powered via energy harvesting, also referred to as an energy harvesting node, to connect to the WSN 100 in one or more priority timeslots. More particularly, the controller 200 schedules the sensor node 102, and other sensor nodes determined to be powered via energy harvesting, to communicate using timeslots occurring in an initial portion of a superframe, where the initial or early timeslots of a superframe are referred to as priority timeslots.

FIG. 4 shows an illustrative superframe 400 for wireless communication in the network 100. The superframe 400 includes multiple timeslots (e.g., 402) of equal length. The network coordinator 108 manages the network 100 and defines the superframe.

In conventional wireless networks, allocation of timeslots for use by a sensor node does not take into account the power source providing energy to the sensor node. Accordingly, for a sensor node powered via energy harvesting, communication may be scheduled, by the coordinator 108, to occur in a late portion of timeslots in a superframe (i.e., near the end of the superframe). At the beginning of the superframe 400, each sensor node begins checking each timeslot of the superframe to determine whether the timeslot is active (i.e., whether the node needs to activate the radio for communication). The node continues checking timeslots until it has finished checking all slots of the superframe allocated to the node as well as slots of the superframe shared by all the other nodes. Thereafter, the node can enter sleep mode until the start of the next superframe. Because the node remains in an operating power mode until all timeslots allocated to the node and the shared timeslots have passed, the limited power provided by energy harvesting may make powering the node problematic in conventional networks.

Referring again to FIG. 4, as disclosed above, the controller 200 of the coordinator 108, extracts, from the wireless transmissions of the sensor nodes 102-106, information indicating whether the sensor nodes are powered via energy harvesting. If the information extracted by the controller 200 indicates that the senor node 102 is being powered via energy harvesting, then, the controller 200 schedules the sensor node 102 to communicate during the early (i.e., priority) timeslots of the superframe and schedules other sensor nodes, not powered via energy harvesting, to communicate in the later timeslots of the superframe. After the timeslots of the superframe allocated to the sensor node 102 have elapsed, the energy harvesting node 102 can transition from an operating power mode to a low power mode until the start of the next superframe. At the start of the next superframe, the energy harvesting node 102 transitions from the low power mode to the operating power mode and checks each timeslot. Thus, the time during which an energy harvesting node is in a low power mode (e.g., sleep mode) is maximized, which in turn reduces the energy consumption of the energy harvesting nodes.

FIG. 5 shows a flow diagram for a method 500 for scheduling, by a network coordinator, wireless sensor nodes in a wireless sensor network in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 500, as well as other operations described herein, can be implemented as instructions stored in computer readable medium and executed by a processor (e.g., controller 200).

In block 502, a wireless node (e.g., node 102) is attempting to connect to the wireless sensor network 100, and transmits, to the network coordinator 100, a packet including information indicating whether the node 102 is powered via energy harvesting. In some embodiments, the information may include a flag value specifying whether the node 102 is powered by energy harvesting. The controller 200 of the network coordinator 108 extracts the information specifying whether the node 102 is powered by energy harvesting from the received packet, and, in block 504, examines the information to determine whether the wireless node 102 is powered via energy harvesting.

If the node 102 is powered by energy harvesting, then in block 506, the controller 200 in the network coordinator 108 schedules the node 102 to communicate in a priority timeslot of a superframe of the network 100.

However, if the controller 200 determines, based on the extracted information, that the node is not powered via energy harvesting, then, in block 508, the controller 200 schedules the node to communicate in a later timeslot of the superframe. The priority timeslot assigned to a node powered by energy harvesting is earlier in the superframe than the later timeslot assigned to a node not powered by energy harvesting.

In some embodiments, the coordinator 108 may allocate a priority timeslot to an energy harvesting node by reassigning a timeslot currently assigned to a non energy harvesting node to an energy harvesting node, and assigning a later timeslot to the non energy harvesting node.

Figure 6:
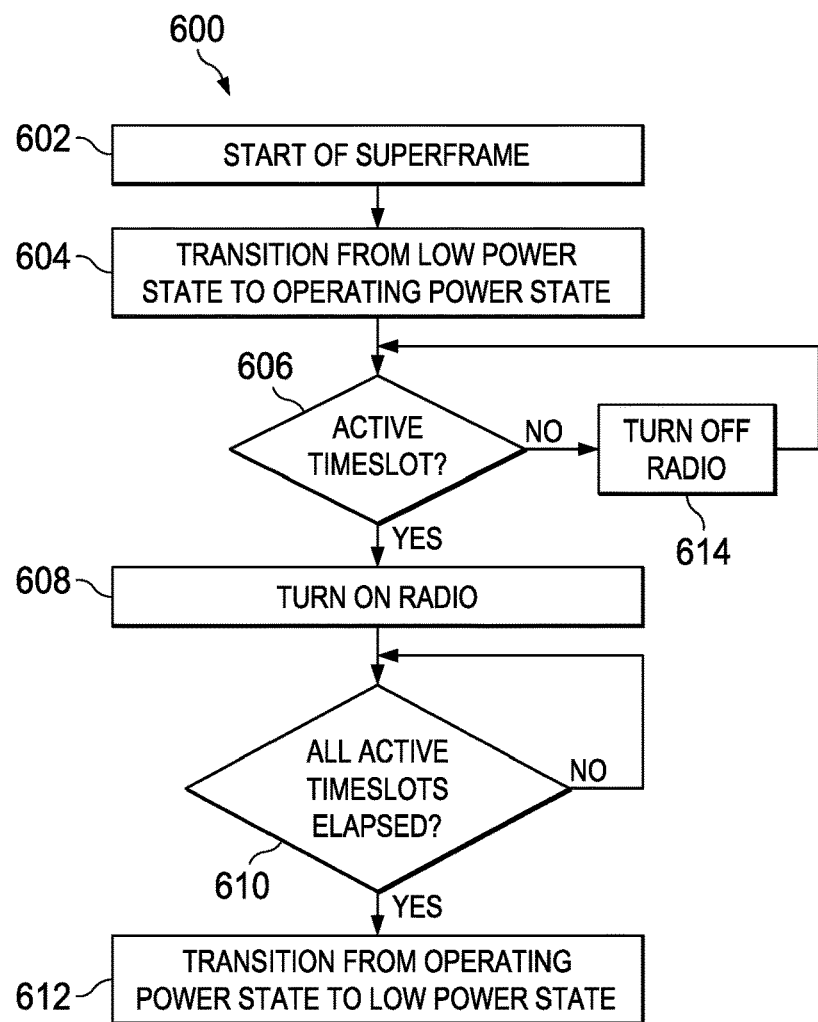
FIG. 6 shows a flow diagram for a method for accessing a wireless sensor network in accordance with various embodiments.

FIG. 6 shows a flow diagram for a method 600, for accessing a wireless sensor network and communicating via the wireless network in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 600, as well as other operations described herein, can be implemented as instructions stored in computer readable medium and executed by a processor.

In block 602, the node 102 detects the start of a superframe. Responsive to detecting the start of the superframe, in block 604, the node 102 transitions from a low power state to an operating power state in order to determine when timeslots allocated to the node 102 for communication (i.e., active timeslots) are occurring.

In block 606, if the node 102 identifies a timeslot as being active, then the node 102 turns its radio on in block 608, and maintains the radio in the on state until all timeslots of the current superframe allocated to the node 102 have elapsed in block 610. If the node 102 does not identify an active timeslot in block 606, the node 102 turns its radio off in block 614.

When all timeslots of the current superframe allocated to the node 102 have elapsed, the node 102 transitions from an operating power mode to a low power mode in block 612, and remains in the low power mode until the start of the next superframe. Because the timeslots allocated to an energy harvesting node may occur near the start of the superframe, embodiments increase the time spent in the low power mode relative to conventional systems.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:
1. A device comprising:
a transceiver; and
a processor configured to:
  receive, via the transceiver, a first communication from a first node of a set of nodes, wherein the first communication includes a flag indicating whether the first node is powered by energy harvesting;
  allocate a priority timeslot in a superframe to the first node based on the flag indicating that the first node is powered by energy harvesting, wherein the priority timeslot occurs at an initial portion of the superframe; and communicate, via the transceiver, the allocation of the priority timeslot to the first node.

2. The device of claim 1, wherein the processor is configured to:

allocate a second timeslot to a second node of the set of nodes, wherein the second timeslot occurs after the priority timeslot; and communicate, via the transceiver, the allocation of the second timeslot to the second node.

3. The device of claim 1, wherein a second node of the set of nodes is a non energy harvesting node, and wherein allocating the priority timeslot to the first node comprises reassigning the priority timeslot from the second node to the first node, and assigning the second node to a later timeslot in the superframe.

4. The device of claim 1, wherein the first communication from the first node is a request to join a network.

5. The device of claim 1, wherein the device is a network coordinator.

6. The device of claim 1, wherein the first communication is a communication in accordance with an IEEE 802.15.4e standard.

7. The device of claim 1, wherein the superframe includes multiple timeslots of equal length.

8. The device of claim 1, wherein the transceiver is configured to provide access to a wireless sensor network.

9. A device comprising:

a transceiver; and a processor configured to:

provide, via the transceiver, a first communication that includes a flag indicating that the device is powered by energy harvesting to receive an allocation of a priority timeslot of a superframe for communication over a network, wherein the priority timeslot occurs at an initial portion of the superframe;

after providing the flag, receive, via the transceiver, the allocation of the priority timeslot; and provide, via the transceiver, a second communication during the priority timeslot.

10. The device of claim 9, further comprising a transducer, wherein the processor is configured to receive a sensor measurement via the transducer, and wherein the second communication comprises the sensor measurement.

11. The device of claim 10, wherein the sensor measurement comprises a temperature measurement, a pressure measurement, an electrical current measurement, or a humidity measurement.

12. The device of claim 9, wherein the processor is configured to:

detect a start of the superframe;

in response to detecting the start of the superframe, transition the device from a low power mode to an operating mode; and after the priority timeslot, transition the device from the operating mode to the low power mode.

13. The device of claim 12, wherein transitioning the device from the operating mode to the low power mode comprises transitioning the device from the operating mode to the low power mode for a remainder of the superframe.

14. The device of claim 9, wherein the device is configured to be powered by solar energy.

15. The device of claim 9, wherein the device is configured to be powered by vibration energy.

16. The device of claim 9, wherein the device is configured to be powered by radio frequency (RF) energy.

17. The device of claim 9, wherein the device is configured to be powered by thermal energy.

18. The device of claim 9, wherein the device is configured to be powered by kinetic energy.

19. The device of claim 9, wherein the first communication is a request to join the network.

20. The device of claim 9, wherein the first communication is a communication in accordance with an IEEE 802.15.4e standard.

\* \* \* \* \*